US012651679B2

(12) United States Patent 
Uno et al.

(10) Patent No.: US 12,651,679 B2 
(45) Date of Patent: Jun. 9, 2026

(54) WIRE HARNESS

(71) Applicant: SUMITOMO WIRING SYSTEMS, LTD., Mie (JP)

(72) Inventors: Hiroki Uno, Mie (JP); Yoshiyuki Matsuo, Mie (JP); Kazuya Takahashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 180 days.

(21) Appl. No.: 18/685,178

(22) PCT Filed: Aug. 23, 2022

(86) PCT No.: PCT/JP2022/031759 
§ 371 (c)(1), 
(2) Date: Feb. 20, 2024

(87) PCT Pub. No.: WO2023/037873 
PCT Pub. Date: Mar. 16, 2023

(65) Prior Publication Data 
US 2025/0140440 A1 May 1, 2025

(30) Foreign Application Priority Data

Sep. 7, 2021 (JP) ................................. 2021-145146

(51) Int. Cl. 
*H01B 7/00* (2006.01) 
*B60R 16/02* (2006.01) 
*H02G 3/04* (2006.01)

(52) U.S. Cl. 
CPC ....... *H01B 7/0045* (2013.01); *B60R 16/0215* (2013.01); *H02G 3/0481* (2013.01)

(58) Field of Classification Search 
CPC ....... H01B 7/0045; H02G 3/04; H02G 3/0481 
See application file for complete search history.

(56) References Cited

U.S. PATENT DOCUMENTS

2006/0134970 A1 6/2006 Watanabe et al. 
2020/0136359 A1 4/2020 Yamauchi et al. 
(Continued)

FOREIGN PATENT DOCUMENTS

JP 2007-028820 A 2/2007 
JP 2007-159258 A 6/2007 
(Continued)

OTHER PUBLICATIONS

International Search Report issued on Nov. 8, 2022 for WO 2023/ 037873 A1 (5 pages).

*Primary Examiner* — Chau N Nguyen 
(74) *Attorney, Agent, or Firm* — Venjuris, P.C.

(57) ABSTRACT

A wire harness includes: a protector including an accommodating portion and an attachment portion; an electric wire passing through the accommodating portion; a fiber protection member made of a cloth with fibers, having flexibility, and covering at least an area of the electric wire that extends along the attachment portion and an area of the electric wire that extends outward of the protector relative to the attachment portion; and a fastening member fastening the fiber protection member and the attachment portion. The attachment portion has a protrusion protruding from the extension portion toward the fiber protection member and caught by the fibers of the fiber protection member. A part of the fiber protection member that extends in the circumferential direction of the electric wire is covered by the attachment portion, and another part of the fiber protection member is fastened toward the attachment portion by the fastening member.

8 Claims, 7 Drawing Sheets

(56)        References Cited

U.S. PATENT DOCUMENTS

2020/0251890 A1      8/2020   Yamauchi et al.
2022/0290339 A1*     9/2022   Qiu ......................... D03D 3/02

FOREIGN PATENT DOCUMENTS

JP          2010-116933  A      5/2010
WO          2012/111179  A1     8/2012

* cited by examiner

WIRE HARNESS

CROSS REFERENCE TO RELATED APPLICATIONS

This application is a national phase of PCT application No. PCT/JP2022/031759, filed on 23 Aug. 2022, which claims priority from Japanese patent application No. 2021-145146, filed on 7 Sep. 2021, all of which are incorporated herein by reference.

TECHNICAL FIELD

The present disclosure relates to a wire harness.

BACKGROUND

Patent Document 1 discloses a wire harness protection tool. The protection tool described in Patent Document 1 has a tubular member through which a wire harness with a corrugated tube can be passed. The tubular member is made by combining two semi-cylindrical members. Each of the two semi-cylindrical members has a projection to be fitted into a recessed portion of the corrugated tube, and the projections extend over the entire circumference of the corrugated tube when the two semi-cylindrical members are combined to form the tubular member.

PRIOR ART DOCUMENT

Patent Document

Patent Document 1: WO 2012/111179 A1

SUMMARY OF THE INVENTION

Problems to be Solved

It is desirable that an electric wire can be protected even in a section in which high bendability is required.

It is an object to provide a technology that makes it possible to protect an electric wire even in a section in which high bendability is required.

Means to Solve the Problem

A wire harness of the present disclosure is a wire harness including: a protector including: an accommodating portion having a first opening and a second opening; and an attachment portion provided on the first opening side of the accommodating portion; an electric wire passing through the accommodating portion via the first opening and the second opening; a fiber protection member made of a cloth with fibers, having flexibility, and covering at least an area of the electric wire that extends along the attachment portion and an area of the electric wire that extends outward of the protector relative to the attachment portion; and a fastening member fastening the fiber protection member and the attachment portion by being wound around the fiber protection member and the attachment portion, wherein the attachment portion has: an extension portion extending outside the fiber protection member in an extending direction of the electric wire; and a protrusion protruding from the extension portion toward the fiber protection member and caught by the fibers of the fiber protection member, and a part of the fiber protection member that extends in a circumferential direction of the electric wire is covered by the attachment portion, and another part of the fiber protection member is fastened toward the attachment portion by the fastening member.

Effect of the Invention

According to the present disclosure, it is possible to also protect an electric wire even in a section in which high bendability is required.

DETAILED DESCRIPTION TO EXECUTE THE INVENTION

Description of Embodiments of Present Disclosure

Figure 1:
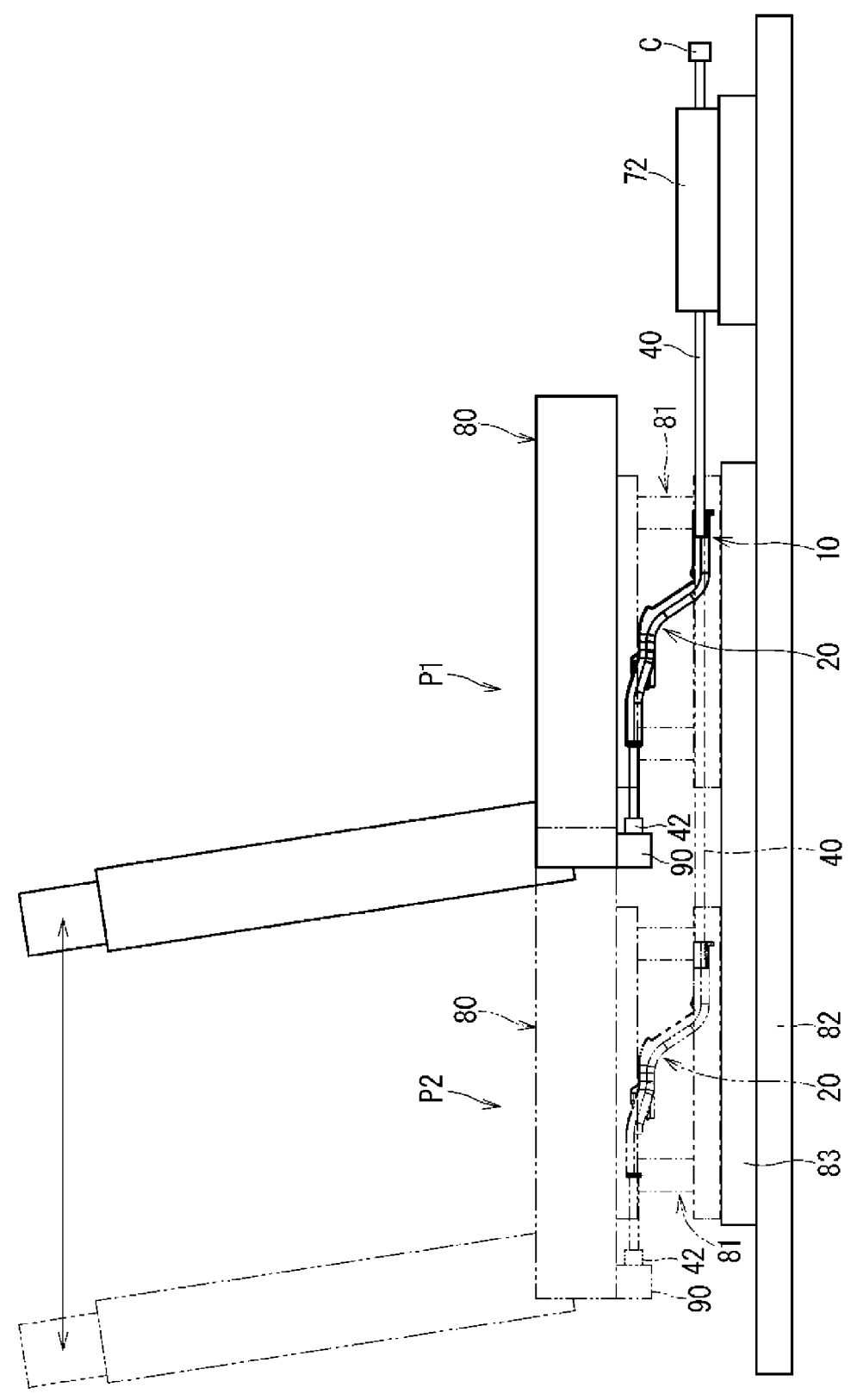
FIG. 1 is a schematic side view of a wire harness and an attachment structure thereof according to Embodiment 1.

Firstly, embodiments of the present disclosure will be listed and described.

A wire harness of the present disclosure is as follows.

(1) A wire harness includes: a protector including: an accommodating portion having a first opening and a second opening; and an attachment portion provided on the first opening side of the accommodating portion; an electric wire passing through the accommodating portion via the first opening and the second opening; a fiber protection member made of a cloth with fibers, having flexibility, and covering at least an area of the electric wire that extends along the attachment portion and an area of the electric wire that extends outward of the protector relative to the attachment portion; and a fastening member fastening the fiber protection member and the attachment portion by being wound around the fiber protection member and the attachment portion, wherein the attachment portion has: an extension portion extending outside the fiber protection member in an extending direction of the electric wire; and a protrusion protruding from the extension portion toward the fiber protection member and caught by the fibers of the fiber protection member, and a part of the fiber protection member that extends in a circumferential direction of the electric wire is covered by the attachment portion, and another part of the fiber protection member is fastened toward the attachment portion by the fastening member. According to the wire harness configured as described above, a part of the fiber protection member that extends in the circumferential direction is covered by the attachment portion, and the other part of the fiber protection member is fastened towards the attachment portion by the fastening member, thereby keeping the protrusion of the attachment portion caught by the fibers of the fiber protection member. The flexible fiber protection member covers the area of the electric wire that extends outward of the protector relative to the attachment portion, and can thus be disposed also in an area in which high bendability is required. With this configuration, it is possible to protect the electric wire even in a section in which high bendability is required.

(2) In the wire harness according to the item (1), the attachment portion may have a restricting portion provided on an outer side of the extension portion and restricting a position of the fastening member. This makes it unlikely for the fastening member to be displaced relative to the attachment portion.

(3) In the wire harness according to the item (1) or (2), the fastening member may be provided at the same position as the protrusion in an extending direction of the extension portion. With this configuration, the fastening member fastens the area of the fiber protection member on the side opposite to the side where the projection is located in the circumferential direction, thus making it unlikely that the state where the protrusion is caught by the fibers is canceled.

(4) In the wire harness according to any one of the items (1) to (3), the protrusion may protrude in a direction in which the protrusion is locked by the fiber protection member when the fiber protection member is pulled outward of the protector. With this configuration, the locking between the protector and the fiber protection member is prevented from being canceled even if the fiber protection member is pulled outward of the protector.

(5) In the wire harness according to the item (4), the protector may be fixed to a movable member that is to be movably attached to a vehicle body, an area of the electric wire that is fixed to the protector may be movable together with the movable member relative to the vehicle body, and an outer area of the electric wire that extends out from the first opening may be to be fixed to the vehicle body, and the fiber protection member may be pulled outward of the protector when the movable member moves. With this configuration, the locking between the protector and the fiber protection member is prevented from being canceled even if the fiber protection member is pulled outward of the protector when the movable member moves.

(6) In the wire harness according to any one of the items (1) to (5), a protruding dimension of the protrusion from the extension portion may be smaller than or equal to a thickness dimension of the cloth. This configuration makes it unlikely for the protrusion to extend through the cloth, and makes it unlikely for the leading end of the protrusion to come into contact with the electric wire.

(7) In the wire harness according to any one of the items (1) to (6), the fiber protection member may be a tubular member, an outer diameter of the electric wire may be smaller than an inner diameter of the fiber protection member, and the fiber protection member may be deformed such that a part and another part of the fiber protection member in a circumferential direction overlap each other in a radial direction, and the fastening member may maintain the deformed state. This configuration realizes different diameters using one type of fiber protection member. The fiber protection member is maintained in a deformed state such that a part and the other part thereof in the circumferential direction overlap each other in the radial direction. Thus, there is less room for further deformation of the fiber protection member, and it is therefore possible to prevent further deformation of the fiber protection member from canceling the state where the protrusion is caught.

DETAILS OF EMBODIMENTS OF PRESENT DISCLOSURE

Specific examples of the wire harness of the present disclosure will be described below with reference to the drawings. It should be noted that the present disclosure is not limited to these examples but is defined by the claims, and is intended to include all changes made within the meaning and scope equivalent to the claims.

Embodiment 1

Figure 2:
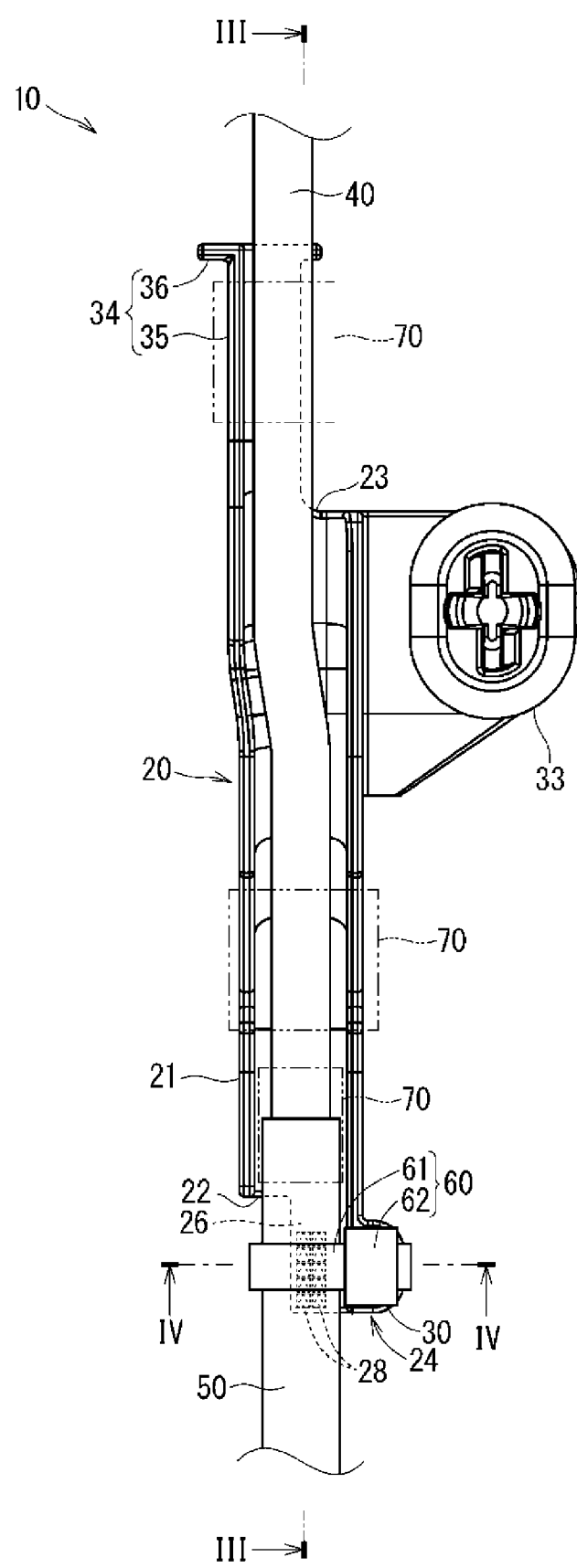
FIG. 2 is a schematic plan view of the wire harness according to Embodiment 1.
Figure 3:
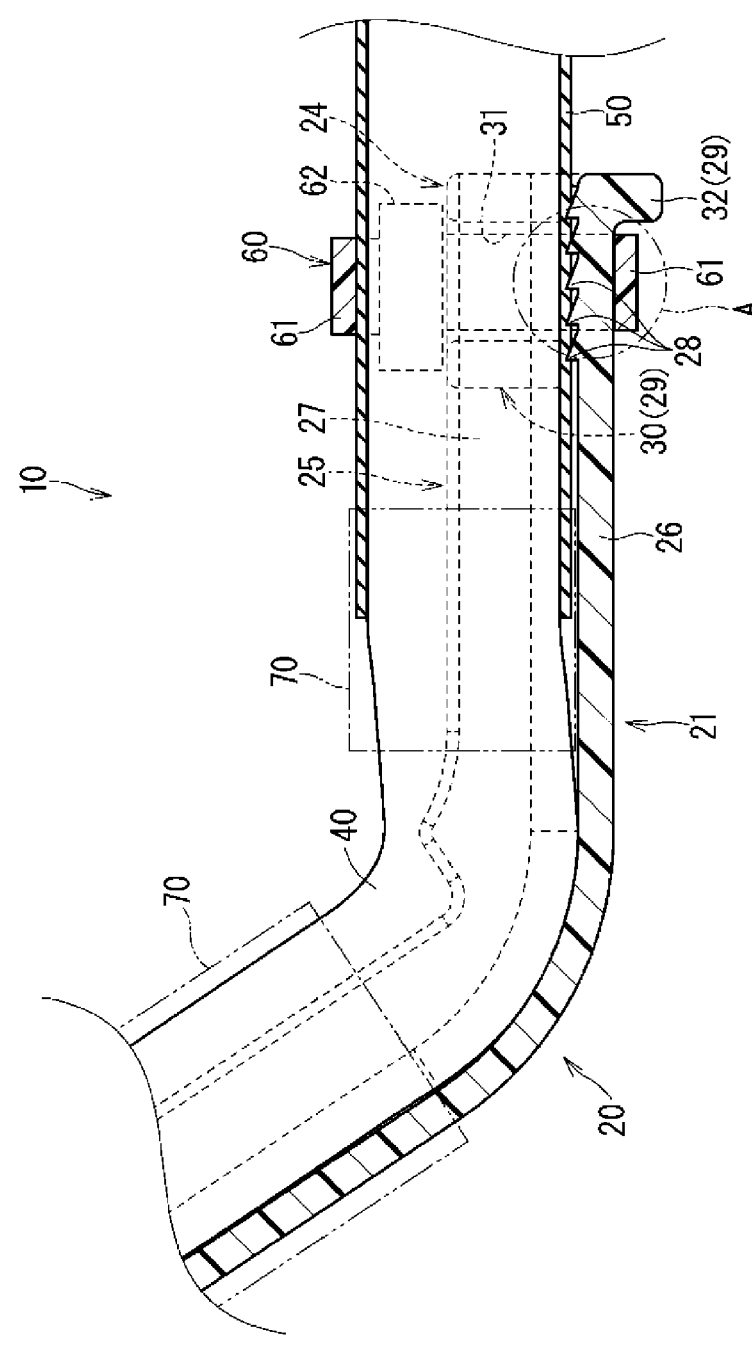
FIG. 3 is a cross-sectional view taken along a line III-III in FIG. 2.
Figure 4:
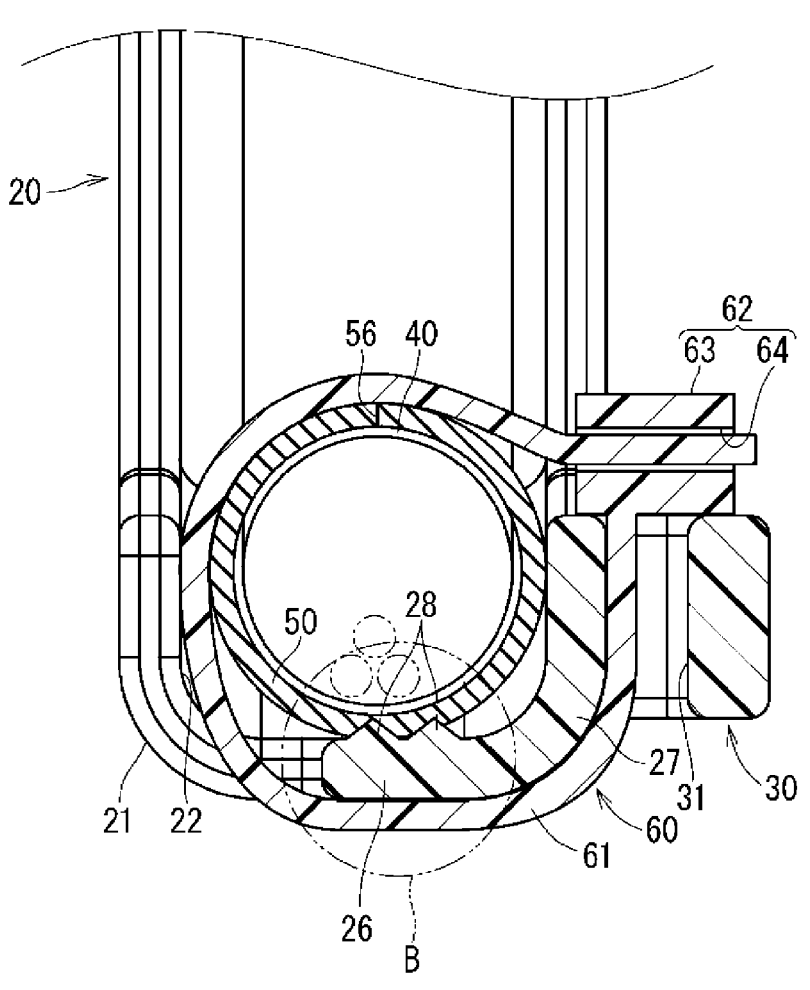
FIG. 4 is a cross-sectional view taken along a line IV-IV in FIG. 2.
Figure 5:
FIG. 5 is a perspective view of a protector.
Figure 5:
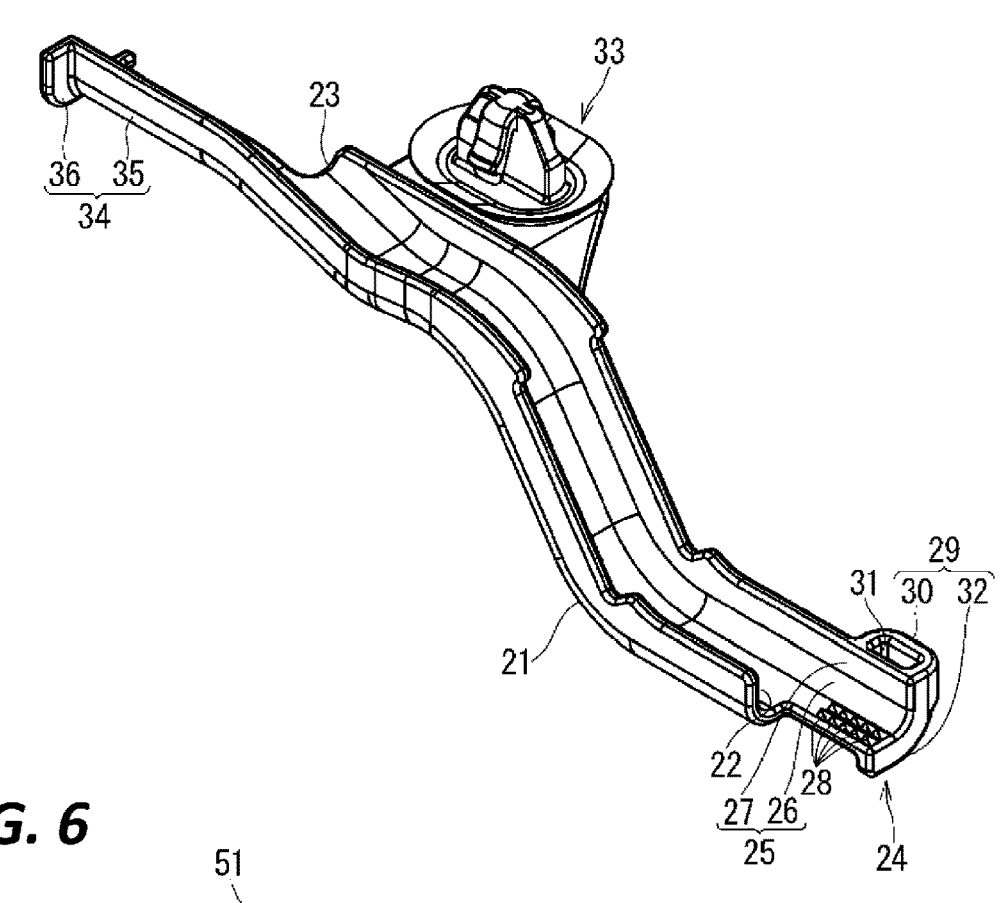

The following is a description of a wire harness according to Embodiment 1. FIG. 1 is a schematic side view of a wire harness 10 and an attachment structure thereof according to Embodiment 1. FIG. 2 is a schematic plan view of the wire harness 10 according to Embodiment 1. FIG. 3 is a cross-sectional view taken along a line III-III in FIG. 2. FIG. 4 is a cross-sectional view taken along a line IV-IV in FIG. 2. FIG. 5 is a perspective view of the protector 20.

The wire harness 10 includes a protector 20, an electric wire 40, a fiber protection member 50, and a fastening member 60. The protector 20 and the fiber protection member 50 are attached to the electric wire 40. The protector 20 and the fiber protection member 50 overlap in one section extending in the extending direction of the electric wires 40. The fastening member 60 is provided at a location where the protector 20 and the fiber protection member 50 overlap. The fastening member 60 keeps the protector 20 and the fiber protection member 50 overlapping.

The protector 20 includes an accommodating portion 21 and an attachment portion 24. The protector 20 also includes a vehicle fixing portion 33 and a second opening-side attachment portion 34. The protector 20 is, for example, a molded product made of resin.

The accommodating portion 21 has a first opening 22 and a second opening 23. The first opening 22 is provided at a first end portion of the accommodating portion 21 in the extending direction. The second opening 23 is provided at a second end portion of the accommodating portion 21 in the extending direction. In this example, the accommodating portion 21 has a tub-like shape having a bottom portion and a pair of side walls. An upper portion of the accommodating portion 21 is open. The accommodating portion 21 may also be provided with a lid that closes the upper opening. The accommodating portion 21 extends straight from the first opening 22 and the second opening 23 in a plan view. The accommodating portion 21 may also have a bent portion between the first opening 22 to the second opening 23 in a plan view.

The first opening 22 and the second opening 23 are shifted in the height direction. There is a level difference between the first opening 22 and the second opening 23 in the accommodating portion 21. To deal with the level difference, the accommodating portion 21 has an area bending in the height direction and an area extending in the height direction. The accommodating portion 21 has an area extending obliquely between the first opening 22 and the second opening 23.

The attachment portion 24 is provided on the first opening 22 side of the accommodating portion 21. The attachment portion 24 has an extension portion 25 and protrusions 28. The attachment portion 24 in this example also has a restricting portion 29.

The extension portion 25 extends outside the fiber protection member 50 in the extending direction of the electric wire 40. The extension portion 25 extends outward of the protector 20 from an end portion of the accommodating portion 21. The extension portion 25 extends straight from the end portion of the accommodating portion 21. The extension portion 25 has a lateral cross-section corresponding to a partially cut-out lateral cross-section of the accommodating portion 21. The extension portion 25 has an L-shape and has a bottom portion 26 and a side wall 27. The bottom portion 26 of the extension portion 25 may be an extension of one area of the bottom portion of the accommodating portion 21. The side wall 27 of the extension portion 25 may be an extension of one side wall of the accommodating portion 21.

The protrusions 28 protrude from the extension portion 25 toward the fiber protection member 50. The protrusions 28 are formed so as to be caught by fibers of the fiber protection member 50. The number of protrusions 28, as well as the position, shape, size, and the like of each protrusion 28 are not specifically limited, and may be set as appropriate within the range where the protrusion(s) 28 can be caught by the fibers of the fiber protection member 50.

Regarding the number of protrusions 28, here, only a plurality of protrusions 28 are formed. A plurality of (five here) protrusions 28 are formed in the extending direction of the extension portion 25. A plurality of (two here) protrusions 28 are formed in the width direction of the extension portion 25. Accordingly, here, ten protrusions are formed. The number of protrusions 28 may alternatively be one. One protrusion 28 may be formed along the extending direction of the extension portion 25. One protrusion 28 may alternatively be formed along the width direction of the extension portion 25.

Regarding the position of the protrusions 28, here, the protrusions 28 are formed on the bottom portion 26 of the extension portion 25. The protrusions 28 may alternatively be formed on the side wall 27 of the extension portion 25. The plurality of protrusions 28 are formed at a constant pitch in each of the extending direction and the width direction of the extension portion 25. The plurality of protrusions 28 are disposed in the form of points on a grid. The plurality of protrusions 28 may alternatively be formed at different pitches. The plurality of protrusions 28 may be disposed in a staggered arrangement.

Regarding the shape of each protrusion 28, here, the protrusion 28 has a quadrangular pyramid shape. The shape of the protrusion 28 may alternatively be a triangular column shape or the like. Further, regarding the shape of each protrusion 28, here, the protrusion 28 protrudes in a direction in which the protrusion 28 is locked at the fiber protection member 50 when the fiber protection member 50 is pulled outward of the protector 20. Each protrusion 28 has a leading end protruding toward the second opening 23 in the extending direction of the extension portion 25. An apex of the protrusion 28 is biased toward the second opening 23 in the extending direction of the extension portion 25, from the center of the bottom face of the protrusion 28. In a plan view, the apex of the protrusion 28 overlaps one of the four sides of the bottom face of the protrusion 28 that is located on the second opening 23 side in the extending direction of the extension portion 25. One side face of the protrusion 28 is a vertical face. In a plan view, the apex of the protrusion 28 is located at the center of the bottom face in the width direction of the extension portion 25. In a plan view, the apex of the protrusion 28 may be located closer to the second opening 23 than the one of the four sides of the bottom face of the protrusion 28 that is located on the second opening 23 side in the extending direction of the extension portion 25. One side face of the protrusion 28 may have a U-bent shape.

Regarding the size of each protrusion 28, here, the protrusion 28 has a height dimension smaller than the length dimension of each side of the bottom face.

The restricting portion 29 is provided on the outer face of the extension portion 25. The restricting portion 29 restricts the position of the fastening member 60. The restricting portion 29 has a band insertion portion 30 and a rib 32.

The band insertion portion 30 allows a cable tie 60, which serves as the fastening member 60, to pass therethrough. The band insertion portion 30 has a facing part that faces the extension portion 25, and a pair of connecting parts that connect the facing part to the extension portion 25. The insertion hole 31 is an area surrounded by the extension portion 25, the facing part, and the pair of connecting parts.

The band insertion portion 30 is provided on the side wall 27 of the extension portion 25. The axial direction of the insertion hole 31 is parallel with the height direction of the side wall 27. In the L-shaped extension portion 25, the protrusions 28 are provided on the bottom portion 26, and the band insertion portion 30 is provided on the side wall 27. With this configuration, the protruding direction of the protrusions 28 and the axial direction of the insertion hole 31 can be made parallel, and the protrusions 28 and the band insertion portion 30 can be formed using a simple, vertically pulled mold.

The protrusions 28 are provided at the same position as the band insertion portion 30 in the extending direction of the extension portion 25. Each protrusion 28 is smaller than the insertion hole 31. The total dimension of the five protrusions 28 arranged in the extending direction in the extension portion 25 is larger than the dimension of the insertion hole 31.

The rib 32 is provided on a leading end side of the extension portion 25 relative to the insertion hole 31. Here, the rib 32 is provided at a leading end of the extension portion 25. The rib 32 may be provided over the entire periphery of the L-shaped extension portion 25. Here, a part of the rib 32 also serves as a joint portion of the band insertion portion 30. The rib 32 is located next to the insertion hole 31. The protruding dimension of the rib 32 from the extension portion 25 may be any dimension as long as the fastening member 60 can be prevented from moving over the rib 32, and may be, for example, the same as or larger than the thickness of the band 61. The protruding dimension of the rib 32 from the extension portion 25 may be about the same as the spacing between the outer face of the extension portion 25 and the inner face of the facing part.

The vehicle fixing portion 33 is a portion for fixing the protector 20 to a vehicle. Here, the vehicle fixing portion 33 is a clip 33. The vehicle fixing portion 33 may alternatively be a screw hole or the like. Here, the vehicle fixing portion 33 is provided on the side of an end portion of the accommodating portion 21 on the second opening 23 side. The vehicle fixing portion 33 may alternatively be provided, for example, on the side of an end portion of the accommodating portion 21 on the first opening 22 side. The vehicle fixing portion 33 is provided on the side on which the side wall 27 of the extension portion 25 of the attachment portion 24 is located. Although one vehicle fixing portion 33 is provided in the example shown in FIG. 4, more than one vehicle fixing portion 33 may alternatively be provided.

The second opening-side attachment portion 34 extends from an end portion of the accommodating portion 21 on the second opening 23 side. The second opening-side attachment portion 34 has an extension portion 35 and a rib 36. The extension portion 35 has a bottom portion and one side wall. The side wall of the extension portion 35 of the second opening-side attachment portion 34 is provided on the side opposite to the side wall 27 of the extension portion 25 of the attachment portion 24. The side wall 27 of the extension portion 25 of the attachment portion 24 extends from one of the two side walls of the accommodating portion 21, and the side wall of the extension portion 35 of the second opening-side attachment portion 34 extends from the other side wall of the accommodating portion 21. The extension portion 35 is longer than the extension portion 25. This makes it easy to secure the area of the extension portion 35 around which the tape is wound. The rib 36 is provided at a leading end of the extension portion 35. The rib 36 protrudes around the extension portion 35. The rib 36 protrudes in the circumferential direction of the extension portion 35, outward of a leading end portion of the bottom portion.

The electric wire 40 passes through the accommodating portion 21 via the first opening 22 and the second opening 23. At least one electric wire 40 is provided. Here, the electric wire 40 includes a plurality of electric wires. The plurality of electric wires included in the electric wire 40 may be bundled to have a substantially round cross section. A first end portion of the electric wire 40 extends to the outside of the accommodating portion 20 from the first opening 22. A second end portion of the electric wire 40 extends to the outside of the accommodating portion 20 from the second opening 23. The first end portion and the second end portion of the electric wire 40 are each connected to a device 90 via a connector 42 or the like.

An adhesive tape 70 is wound around the electric wire 40 and the protector 20, at the second opening-side attachment portion 34. The electric wire 40 and the protector 20 are thus fixed on the second opening 23 side. The adhesive tape 70 is also wound around the electric wire 40 and the protector 20, in an area of the electric wire 40 that extends obliquely along the protector 20. This configuration prevents the electric wire 40 from separating from the protector 20.

The fiber protection member 50 is made of a cloth 51 with fibers. The fiber protection member 50 is flexible. The fiber protection member 50 covers at least an area of the electric wire 40 that extends along the attachment portion 24 and an area of the electric wire 40 that extends outward of the protector 20 relative to the attachment portion 24. The fibers are made of resin, such as PP (polypropylene) or PET (polyethylene terephthalate). The fiber protection member 50 is not metal braided.

Figure 6:
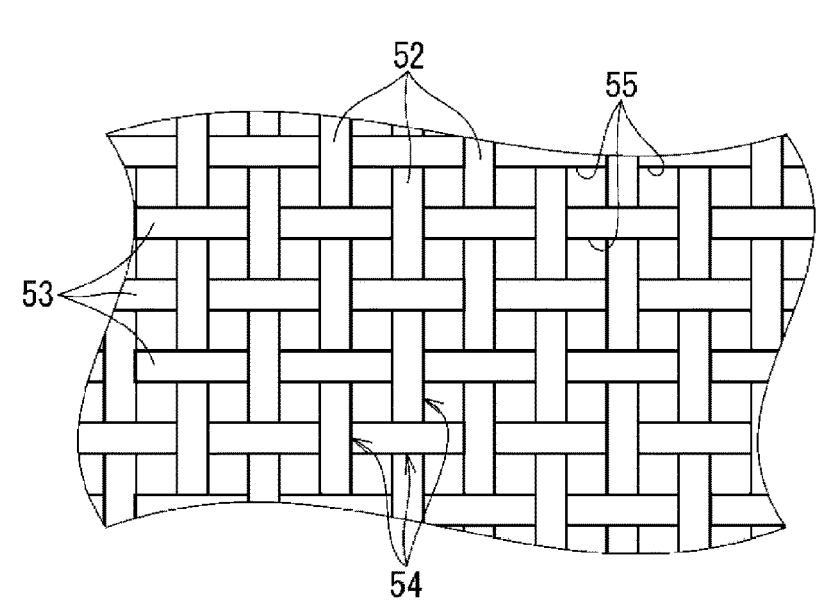
FIG. 6 is an enlarged view of a cloth of a fiber protection member.

FIG. 6 is an enlarged view of the cloth 51 of the fiber protection member 50.

The cloth 51 in this example is a woven fabric. The woven fabric has warp threads 52 and weft threads 53 that cross each other. The warp threads 52 and weft threads 53 have fibers. The warp threads 52 and the weft threads 53 may be monofilaments each of which is made of one fiber, or multifilaments each of which is obtained by entwining a plurality of fibers. The cloth 51 may alternatively be a knitted fabric, a nonwoven fabric, or the like. A knitted fabric has threads that extend while forming loops. One section of each thread is entangled with another section via a loop. A nonwoven fabric has fibers that are maintained in an irregularly arranged state.

The cloth 51 has intersection portions 54 at which the fibers intersect. If the cloth 51 is a woven fabric, the intersection portions 54 are portions at which the warp threads 52 and the weft threads 53 intersect. The intersection portions 54 include intersection portions at each of which a warp thread 52 is located outward of a weft thread 53, and intersection portions at which a weft thread 53 is located outward of a warp thread 52.

The cloth 51 has openings 55. If the cloth 51 is a woven fabric, the openings 55 are formed between two adjacent warp threads 52 and between two adjacent weft threads 53. The cloth 51 need not necessarily have the openings 55. If the cloth 51 is a woven fabric, the openings 55 may be eliminated in the cloth 51 in a normal state by bringing two adjacent warp threads 52 into contact with each other and two adjacent weft threads 53 into contact with each other.

The protruding dimension of the protrusions 28 from the extension portion 25 is smaller than or equal to the thickness dimension of the cloth 51. The thickness dimension of the cloth 51 is about the same as the total of the thickness of the warp thread 52 and the thickness of the weft thread 53. The thickness dimension of the cloth 51 is, for example, 0.3 mm to 0.5 mm. The protruding dimension of the protrusions 28 from the extension portion 25 may alternatively be, for example, larger than or equal to 0.2 times the thickness dimension of the cloth 51, or smaller than or equal to the thickness dimension of the cloth 51. The protruding dimension of the protrusions 28 from the extension portion 25 may alternatively be, for example, larger than or equal to 0.4 times the thickness dimension of the cloth 51, or smaller than or equal to 0.8 times the thickness dimension of the cloth 51. The protruding dimension of each protrusion 28 from the extension portion 25 may alternatively be, for example, larger than or equal the thickness of each warp thread 52. The protruding dimension of the protrusions 28 from the extension portion 25 may alternatively be, for example, larger than or equal the thickness of each weft thread 53.

The fiber protection member 50 is a tubular member. For example, the fiber protection member 50 may alternatively be obtained by forming the sheet-type cloth 51 that expands along a plane into a tubular shape. The fiber protection member 50 is a tubular member. The tubular fiber protection member 50 need only be sufficiently rigid such that the tubular shape can be maintained in an initial state, and is less rigid than that of the protector 20, which is a molded product. When the protrusions 28 and the cloth 51 press each other, the cloth 51 more easily deforms than the protrusions 28. For example, when at least either the warp threads 52 or the weft threads 53 are pushed and shifted by the protrusions 28, the openings 55 in the cloth 51 may widen, or a new opening 55 may be formed in an area of the cloth 51 where there was no opening 55 originally.

A slit 56 is formed in the fiber protection member 50. The slit 56 is formed over the entire length of the fiber protection member 50 in the axial direction. The tubular fiber protection member 50 can be attached to the electric wire 40 from the side by opening edges that sandwich the slit 56.

The fastening member 60 is wound around the fiber protection member 50 and the attachment portion 24 and fastens the fiber protection member 50 and the attachment portion 24. The fastening member 60 is provided at the same position as the protrusions 28 in the extending direction of the extension portion 25.

A part of the fiber protection member 50 that extends in the circumferential direction of the electric wire 40 is covered by the attachment portion 24, and another part of the fiber protection member 50 is fastened toward the attachment portion 24 by the fastening member 60.

The fastening member 60 is the cable tie 60. The cable tie 60 has a band 61 and a band fixing portion 62. The band 61 is wound around the fiber protection member 50 and the attachment portion 24. The band fixing portion 62 is provided at a base end of the band 61. The band fixing portion 62 fixes a leading end of the band 61. The band fixing portion 62 has a base 63 and a through-hole 64. The base 63 is formed, for example, in a rectangular-parallelepiped shape. The band 61 extends from an outer face of the base 63. The through-hole 64 extends through the base 63. A leading end portion of the band 61 is passed through the through-hole 64 and fixed. For example, a locking protrusion is provided on an inner face of the through-hole 64. The band 61 has a plurality of recesses. When the leading end portion of the band 61 is passed through the through-hole 64, the locking protrusion is selectively locked at one of the plurality of recesses.

The band 61 passes through the insertion hole 31 in the band insertion portion 30. This configuration restricts the position of the band 61 in the extending direction of the extension portion 25. The base 63 is formed so as to be larger than the insertion hole 31, and cannot be inserted into the insertion hole 31. As a result, the base 63 is caught on the periphery of the insertion hole 31 in the band insertion portion 30, and the cable tie 60 is prevented from rotating in the circumferential direction of the electric wires 40.

The rib 32 is provided on the leading end side of the extension portion 25 relative to the band 61. With this configuration, if the band 61 shifts toward the leading end side of the extension portion 25, the band 61 is caught by the rib 32 and prevented from further shifting. This configuration prevents the area of the band 61 that fastens the bottom portion 26 of the extension portion 25 from coming off outward of the protector 20 in the extending direction of the extension portion 25.

An end portion of the fiber protection member 50 is located on the second opening 23 side relative to the fastening member 60. The end portion of the fiber protection member 50 may alternatively be located within the accommodating portion 21. The end portion of the fiber protection member 50 may be accommodated near the first opening 22. The end portion of the fiber protection member 50 may extend outward of the protector 20 from the second opening 23.

The fiber protection member 50 may be fixed to the electric wire 40 by the adhesive tape 70. This configuration prevents the fiber protection member 50 from rotating around the electric wire 40. An area (e.g. an end portion) of the fiber protection member 50 that is accommodated in the accommodating portion 21 may alternatively be fixed to the electric wire 40 by the adhesive tape 70. This configuration can fix the electric wire 40 and the fiber protection member 50 near the protrusions 28. The adhesive tape 70 is wound around the electric wire 40 and the fiber protection member 50. The adhesive tape 70 is located at a position avoiding the protrusions 28. This configuration prevents the outer face of the fiber protection member 50 from being hidden by the adhesive tape 70 at the position of the protrusions 28.

<Catchment Between Protrusions and Cloth>

Figure 7:
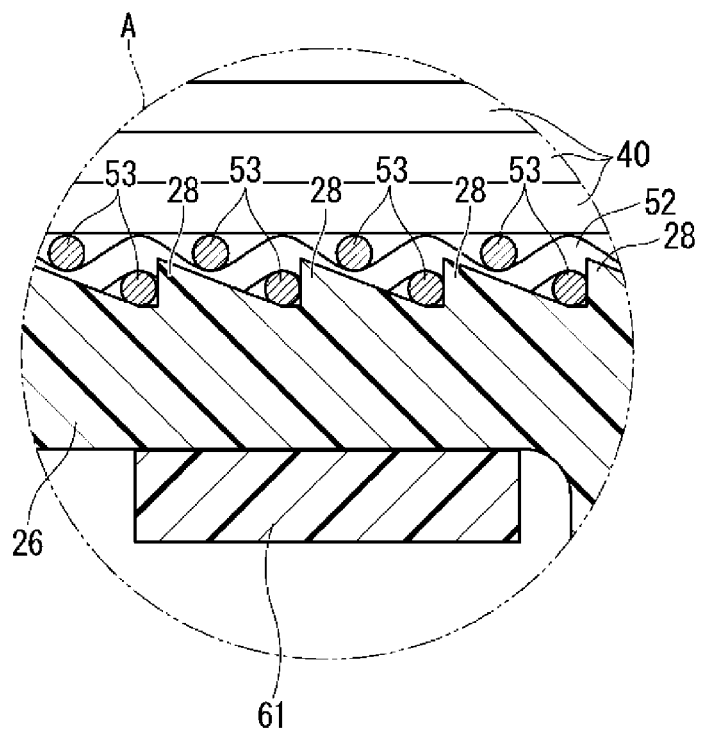
FIG. 7 is an enlarged view of a region A in FIG. 3.
Figure 8:
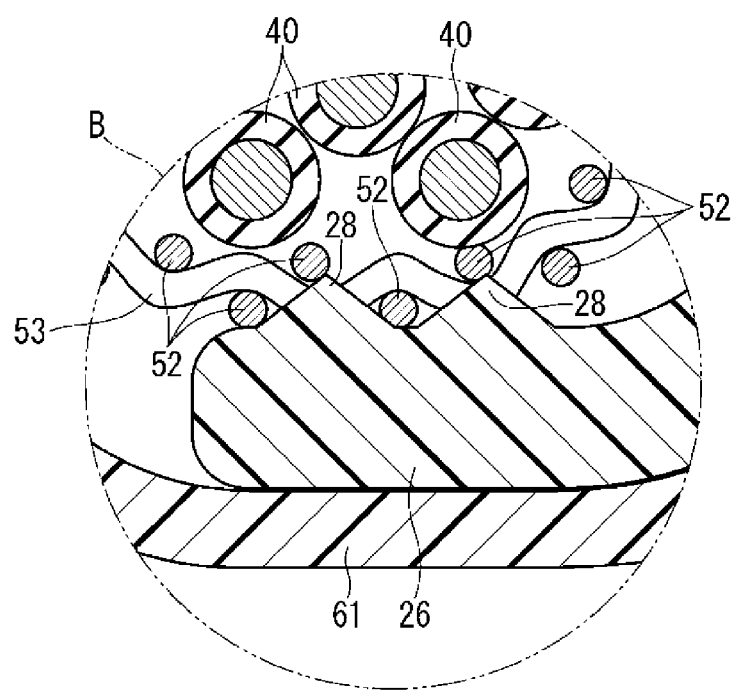
FIG. 8 is an enlarged view of a region B in FIG. 4.

Catchment between the protrusions 28 and the cloth 51 is further described with reference to FIGS. 7 and 8. FIG. 7 is an enlarged view of a region A in FIG. 3. FIG. 8 is an enlarged view of a region B in FIG. 4.

Leading ends of the protrusions 28 are caught by the fibers of the cloth 51. Here, the protrusions 28 are caught by the weft threads 53 (threads extending in the circumferential direction of the electric wire 40). The leading ends of the protrusions 28 enter the openings 55 in the cloth 51. These openings 55 may be the openings 55 originally formed in the cloth 51, or openings 55 newly formed in the cloth 51 by the protrusions 28 shifting at least either the warp threads 52 or the weft threads 53. The weft threads 53 located on the second opening 23 side relative to the protrusions 28 come into contact with vertical surfaces of the protrusions 28, and are prevented from moving further outward of the protector 20.

The electric wire 40 presses the fiber protection member 50 toward the bottom portion 26 as a result of the fastening member 60 fastening the extension portion 25, the electric wire 40, and the fiber protection member 50. Thus, the protrusions 28 at positions overlapping the fastening member 60 in the extending direction of the extension portion 25 are likely to be caught by the weft threads 53.

(Operation Performed to Wire Harness 10)

The wire harness 10 is attached to a portion of the vehicle that moves. Specifically, the protector 20 is fixed to a movable member. The movable member is movably attached to the vehicle body. The movable member is, for example, a seat 80 of the vehicle. The seat 80 has a lower frame 81 that is movably attached to a floor panel 82 via rails 83. The area of the electric wire 40 that is fixed to the protector 20 can move together with the movable member relative to the vehicle body. An outer area of the electric wire 40 that extends out from the first opening 22 is fixed to the vehicle body. For example, the outer area is provided with a retraction protector 72. A part of the electric wire 40 is fixed to the retraction protector 72, and is fixed to the vehicle body together with the retraction protector 72.

With the movement of the seat 80, a retractable area of the electric wire 40 that is on the protector 20 side relative to the area fixed to the retraction protector 72 is pulled out from and retracted into the retraction protector 72. Specifically, the seat 80 can move back and forth between a position P1 (the position indicated by solid lines in FIG. 1), which is closer to the retraction protector 72, and a position P2 (the position indicated by two-dot chain lines in FIG. 1), which is farther from the retraction protector 72 than the position P1. When the seat 80 is located at the position P1, the retractable area is accommodated in the retraction protector 72 to the maximum degree. When the seat 80 moves from the position P1 to the position P2, the retractable area is sequentially retracted from the retraction protector 72. When the seat 80 is located at the position P2, the retractable section is retracted to the maximum degree. When the seat 80 moves from the position P2 to the position P1, the retractable area is retracted into the retraction protector 72.

When the movable member moves, the fiber protection member 50 is pulled outward of the protector 20. When the seat 80 moves from the position P1 to the position P2, the fiber protection member 50 is pulled outward of the protector 20 (toward the retraction protector 72). At this time, if the fastening of the fastening member 60 is insufficient, it is possible that only the electric wire 40 and the protector 20 move together with the movable member while leaving the fiber protection member 50, resulting in canceling the overlapping between fiber protection member 50 and the protector 20. In this example, the fastening of the fastening member 60 is sufficient and prevents the situation where only the electric wire 40 and the protector 20 move together with the movable member while leaving the fiber protection member 50.

More specifically, the protector 20 is fixed to the seat 80 by the vehicle fixing portion 33. A connector at an end of the electric wire 40 is connected to a device 90 in the seat 80.

Thus, the protector 20 and the electric wire 40 are directly pulled by the seat 80. Meanwhile, the fiber protection member 50 is not directly fixed to the seat 80 but is indirectly fixed to the seat 80 via the electric wire 40 and the protector 20. Thus, the fiber protection member 50 receives force from the electric wire 40 and the protector 20 and moves together with the seat 80. At this time, the protrusions 28 of the protector 20 being caught by the fibers of the fiber protection member 50 allows the force from the protector 20 to be easily transmitted to the fiber protection member 50, thus suppressing slippage between the protector 20 and the fiber protection member 50.

<Variation>

Figure 9:
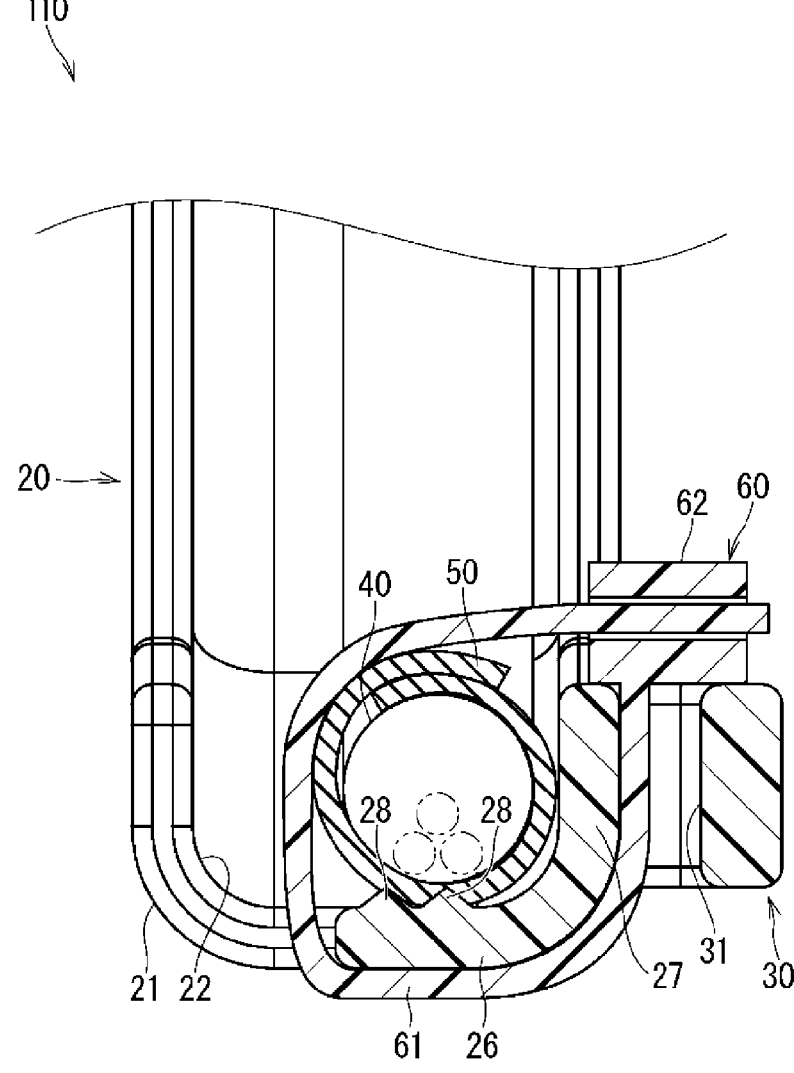
FIG. 9 is a cross-sectional view of a wire harness according to a variation.

FIG. 9 is a cross-sectional view of a wire harness 110 according to a variation.

The outer diameter of the electric wire 40 is smaller than the inner diameter of the fiber protection member 50. If the electric wire 40 includes more than one electric wire, the outer diameter of the electric wire 40 refers to the outer diameter of the electric wire 40 bundle. In the present disclosure, the second end portion of the electric wire 40 is connected to the device 90 in the seat 80. The number of electric wires included in the electric wire 40 is determined in accordance with the number of devices 90, or the type or the like of the device(s) 90 in the seat 80. The device 90 in the seat 80 may include at least one optional device that can be selected by the user. The number of electric wires included in the electric wire 40 varies depending on whether or not any optional device is adopted. The smaller the number of optional devices adopted is, the smaller the number of electric wires included in the electric wire 40 is, and the smaller the outer diameter of the electric wire 40 (the outer diameter of the electric wire 40 bundle) is. The larger the number of optional devices adopted is, the larger the number of electric wires included in the electric wire 40 is, and the larger the outer diameter of the electric wire 40 (the outer diameter of the electric wire 40 bundle) is. The outer diameter of the electric wire 40 (the outer diameter of the electric wire 40 bundle) may be, for example, the same as or smaller than the width dimension of the bottom portion 26.

The fiber protection member 50 is deformed such that a part and another part thereof in the circumferential direction overlap each other in the radial direction. In the example shown in FIG. 9, the fiber protection member 50 is deformed such that a first end portion and a second end portion thereof in the circumferential direction overlap each other in the radial direction. Note that, since the fiber protection member 50 is flexible and unlikely to have a fixed shape when shrinks, it is also possible that the fiber protection member 50 is deformed into a shape other than the shape in the example shown in FIG. 9 (non-circular shape). For example, it is also possible that the fiber protection member 50 is deformed such that an intermediate portion thereof in the circumferential direction protrudes radially outward, and this protruding portion overlaps an area of the fiber protection member 50 that extends along the electric wire 40. It is also possible that a plurality of wrinkles are formed in the fiber protection member 50. In an area where, for example, neither the fastening member 60 nor the adhesive tape 70 is provided, the fiber protection member 50 need not be in intimate contact with the electric wire 40 bundle, and there may be a gap.

It is favorable that the overlapping area of the fiber protection member 50 is provided at a position avoiding the protrusions 28 in the circumferential direction of the electric wire 40, and the area of the fiber protection member 50 that comes into contact with the protrusions 28 is tense. With this configuration, even if the fiber protection member 50 is shrunk, favorable contact between the fiber protection member 50 and the protrusion 28 can be achieved, and the protrusions 28 and the fiber protection member 50 are likely to be in an appropriate catchment state. For example, it is favorable that the overlapping area of the fiber protection member 50 is located in an area that comes into contact with the fastening member 60.

The fiber protection member 50 is maintained in the deformed state by the fastening member 60. If the fiber protection member 50 is shrunk in advance near the fastening member 60 when the fiber protection member 50 is fixed to the electric wire 40 by the adhesive tape 70, the fiber protection member 50 can be easily kept in the shape shrunk by the adhesive tape 70 even at the position of the fastening member 60, and can be easily shrunk in a predetermined shape.

<Effects>

According to the wire harnesses 10 and 110 that are configured as described above, a part of the fiber protection member 50 that extends in the circumferential direction is covered by the attachment portion 24, and another part of the fiber protection member 50 is fastened towards the attachment portion 24 by the fastening member 60, thereby keeping the protrusions 28 of the attachment portion 24 caught by the fibers of the fiber protection member 50. The flexible fiber protection member 50 covers the area of the electric wire 40 that extends outward of the protector 20 relative to the attachment portion 24, and can therefore be also disposed in a section in which high bendability is required. With this configuration, it is possible to also protect the electric wire 40 even in the section in which high bendability is required.

Further, the attachment portion 24 has the restricting portion 29 that is provided on the outer side of the extension portion 25 and restricts the position of the fastening member 60. This makes it unlikely for the fastening member 60 to be displaced relative to the attachment portion 24.

The fastening member 60 is provided at the same position as the protrusions 28 in the extending direction of the extension portion 25. With this configuration, the fastening member 60 fastens the area of the fiber protection member 50 on the side opposite to the side where the protrusions 28 are located in the circumferential direction, thus making it unlikely that the state where the protrusions 28 are caught by the fibers is canceled.

The protrusions 28 protrude in a direction in which the protrusions 28 are locked by the fiber protection member 50 when the fiber protection member 50 is pulled outward of the protector 20. This configuration prevents the locking between the protector 20 and the fiber protection member 50 from being canceled even if the fiber protection member 50 is pulled outward of the protector 20.

The protector 20 is fixed to the seat 80, which is movably attached to the floor panel 82. The area of the electric wire 40 that is fixed to the protector 20 can move together with the seat 80 relative to the floor panel 82. The outer area of the electric wire 40 that extends out from the first opening 22 is fixed to the vehicle body. The fiber protection member 50 is pulled outward of the protector 20 when the seat 80 moves. This configuration prevents the locking between the protector 20 and the fiber protection member 50 from being canceled even if the fiber protection member 50 is pulled outward of the protector 20 when the seat 80 moves.

The protruding dimension of the protrusions 28 from the extension portion 25 is smaller than or equal to the thickness dimension of the cloth 51. This configuration makes it unlikely for the protrusions 28 to extend through the cloth 51, and makes it unlikely for the leading ends of the protrusions 28 to come into contact with the electric wire 40.

According to the wire harness 110, the fiber protection member 50 is a tubular member. The outer diameter of the electric wire 40 is smaller than the inner diameter of the fiber protection member 50. The fiber protection member 50 is deformed such a part and another part thereof in the circumferential direction overlap each other in the radial direction, and the fastening member 60 maintains the deformed state. With this configuration, the electric wires 40 of different diameters can be dealt with using one type of fiber protection member 50. The fiber protection member 50 is maintained in a deformed state such that a part and another part thereof in the circumferential direction overlap each other in the radial direction. Thus, there is less room for further deformation of the fiber protection member 50, and it is therefore possible to prevent further deformation of the fiber protection member 50 from canceling the state where the protrusions 28 are caught.

Component management is facilitated if common components can be used regardless of the outer diameter of the electric wires 40. Meanwhile, when common components are used, a change in the outer diameter of the electric wire 40 may also change the fixing mode, and it is possible that sufficient fixing force cannot be obtained. In this example, sufficient fixing force can be obtained without depending on the outer diameter of the electric wire 40 even when common components are used, as a result of maintaining the catchment between the fiber protection member 50 and the protrusions 28 using the fastening member 60.

SUPPLEMENTARY NOTES

In the above description, the attachment portion 24 has the restricting portion 29 that is provided on the outer side of the extension portion 25 and restricts the position of the fastening member 60, but this is not an essential configuration. For example, the attachment portion 24 need not necessarily have the restricting portion 29. Further, the restricting portion 29 need necessarily not include both the band insertion portion 30 and the rib 32, and either one of the band insertion portion 30 and the rib 32 may be omitted.

In the above description, the fastening member 60 is located at the same position as the protrusions 28 in the extending direction of the extension portion 25, but this is not an essential configuration. For example, the fastening member 60 may alternatively be located at a different position from the protrusions 28 in the extending direction of the extension portion 25.

In the above description, the protrusions 28 protrude in a direction in which the protrusions 28 are locked by the fiber protection member 50 when the fiber protection member 50 is pulled outward of the protector 20. However, this is not an essential configuration. For example, the protrusions 28 may alternatively protrude in a direction in which the protrusions 28 are locked by the fiber protection member 50 when the fiber protection member 50 is pulled inward of the protector 20.

In the above description, the protector 20 is fixed to the movable member (seat 80) that is movably attached to the vehicle body (floor panel 82). The area of the electric wire 40 that is fixed to the protector 20 can move together with the movable member (seat 80) relative to the vehicle body. The outer area of the electric wire 40 that extends out from the first opening 22 is fixed to the vehicle body. The fiber protection member 50 is pulled outward of the protector 20 when the movable member (seat 80) moves. However, this is not an essential configuration. The protector 20 may alternatively be fixed to an openable/closable member, for example. The protector 20 may alternatively be fixed in an unmovable manner, for example. The fiber protection member 50 may be pulled in response to, for example, the openable/closable member being opened or closed, or vibrations of the vehicle.

In the above description, the protruding dimension of the protrusions 28 from the extension portion 25 is smaller than or equal to the thickness dimension of the cloth 51. However, this is not an essential configuration. For example, the protruding dimension of the protrusions 28 from the extension portion 25 may alternatively be larger than the thickness dimension of the cloth 51.

Note that configurations described in the above embodiments and variations can be combined as long as no contradiction arises.

LIST OF REFERENCE NUMERALS

10 Wire harness
20 Protector
21 Accommodating portion
22 First opening
23 Second opening
24 Attachment portion
25 Extension portion
26 Bottom portion
27 Side wall
28 Protrusion
29 Restricting portion
30 Band insertion portion
31 Insertion hole
32 Rib
33 Clip (vehicle-fixed portion)
34 Second opening-side attachment portion
35 Extension portion
36 Rib
40 Electric wire
42 Connector
50 Fiber protection member
51 Cloth
52 Warp thread
53 Weft thread
54 Intersection portion
55 Opening
56 Slit
60 Cable tie (fastening member)
61 Band
62 Band fixing portion
63 Base
64 Through-hole
70 Adhesive tape
72 Retraction protector
80 Seat (movable member)
81 Frame
82 Floor panel (vehicle body)
83 Rail
90 Device

What is claimed is:
1. A wire harness comprising:
a protector including:
an accommodating portion having a first opening and a second opening; and
an attachment portion provided on the first opening side of the accommodating portion;

an electric wire passing through the accommodating portion via the first opening and the second opening;

a fiber protection member made of a cloth with fibers, having flexibility, and covering at least an area of the electric wire that extends along the attachment portion and an area of the electric wire that extends outward of the protector relative to the attachment portion; and a fastening member fastening the fiber protection member and the attachment portion by being wound around the fiber protection member and the attachment portion, wherein the fiber protection member includes a part that extends in a circumferential direction of the electric wire and is covered by the attachment portion and another part that is fastened toward the attachment portion by the fastening member, the attachment portion has:

an extension portion extending outside the fiber protection member in an extending direction of the electric wire; and a protrusion protruding from the extension portion toward the fiber protection member and being caught by the fibers of the fiber protection member, and the fastening member is provided at a same position as the protrusion in an extending direction of the extension portion.

2. The wire harness according to claim 1, wherein the attachment portion has a restricting portion provided on an outer side of the extension portion and restricting a position of the fastening member.

3. The wire harness according to claim 1, wherein the protrusion protrudes in a direction in which the protrusion is locked by the fiber protection member when the fiber protection member is pulled outward of the protector.

4. The wire harness according to claim 3, wherein the protector is fixed to a movable member that is to be movably attached to a vehicle body, an area of the electric wire that is fixed to the protector is movable together with the movable member relative to the vehicle body, and an outer area of the electric wire that extends out from the first opening is to be fixed to the vehicle body, and the fiber protection member is pulled outward of the protector when the movable member moves.

5. The wire harness according to claim 1, wherein a protruding dimension of the protrusion from the extension portion is smaller than or equal to a thickness dimension of the cloth.

6. The wire harness according to claim 1, wherein the fiber protection member is configured to expand along a plane into a tubular shape, the fiber protection member including a first end portion and a second end portion in a circumferential direction of the tubular shape, an outer diameter of the electric wire is smaller than an inner diameter of the fiber protection member, and the fiber protection member is further configured to be deformed such that the first end portion and the second end portion overlap each other in a radial direction, and the fastening member maintains the deformed state.

7. A wire harness comprising:

a protector including:

an accommodating portion having a first opening and a second opening; and an attachment portion provided on the first opening side of the accommodating portion;

an electric wire passing through the accommodating portion via the first opening and the second opening;

a protection member having flexibility and covering at least an area of the electric wire that extends along the attachment portion and an area of the electric wire that extends outward of the protector relative to the attachment portion; and a fastening member fastening the protection member and the attachment portion by being wound around the protection member and the attachment portion, wherein the protection member includes a part that extends in a circumferential direction of the electric wire and is covered by the attachment portion and another part that is fastened toward the attachment portion by the fastening member, the attachment portion has:

an extension portion extending outside the protection member in an extending direction of the electric wire; and a protrusion protruding from the extension portion toward the protection member and engaging with an outer face of the protection member, and the fastening member is provided at a same position as the protrusion in an extending direction of the extension portion.

8. The wire harness according to claim 7, wherein the protection member is made of a cloth with fibers, and the protrusion is configured to be caught in the fibers of the protection member.

* * * * *